Patented May 23, 1939

2,159,313

UNITED STATES PATENT OFFICE 2,159,313

PROCESS FOR BREAKING OIL-IN-WATER TYPE PETROLEUM EMULSIONS

Charles M. Blair, Jr., Webster Groves, Mo., and Charles Clinton Rogers, Jr., San Antonio, Tex., assignors to The Tret-O-Lite Company, Webster Groves, Mo., a corporation of Missouri No Drawing. Application December 13, 1937, Serial No. 179,472

12 Claims. (Cl. 196—4)

This invention relates to the treatment of a certain peculiar kind of naturally occurring crude oil emulsion and has for its main object to provide a practicable process for separating the water and oil contained in said peculiar emulsion.

The vast majority of petroleum emulsions encountered in the oil fields are of the water-in-oil type and comprise fine droplets of naturally occurring waters or brines dispersed in a more or less permanent state throughout the oil, which constitutes the continuous phase of the emulsion. They are obtained from producing wells and from the bottom of oil storage tanks, and are commonly referred to as "cut oil", "roily oil", "emulsified oil", and "bottom settlings". The present invention is not concerned with the treatment of such conventional water-in-oil type emulsions.

In certain oil fields, there are produced crude oil emulsions which, instead of being of the water-in-oil type, are of the oil-in-water type, and comprise fine droplets of naturally occurring petroleum oil dispersed in a more or less permanent state throughout the water or relatively dilute brine, which constitutes the continuous phase of the emulsion. As far as we are aware, the expressions "cut oil", "roily oil", etc. commonly used to designate conventional water-in-oil type petroleum emulsions are not used to designate or refer to the peculiar oil-in-water type emulsions which our process is capable of successfully treating to recover the oil contained in same.

Although such peculiar emulsions are recognized technically as being of the oil-in-water type, their physical-chemical constitution is only partially understood. It is recognized that one may have emulsions of the oil-in-water type in which the dispersed phase is present to the extent of a few tenths of 1%, or less, in which the stability of the emulsion appears to be predicated on factors other than the presence of a significant amount of a conventional emulsifier; that is, factors such as particle size, electric charge, etc. It is also known that emulsions of the oil-in-water type may exist in which the dispersed phase represents a significant proportion of the total emulsion; for instance, from 3% to 5% of the emulsion, up to 60% to 70%, or even more, provided that there is a protective colloid or conventional emulsifying agent present. However, as far as we are aware, technologists have not been confronted with a type of oil-in-water emulsion in which there was dispersed a significant portion of the oily phase in what appears to be a substantially complete absence of a protective colloid or equivalent thereof. To this extent, although not necessarily due to this factor alone, these particular oil field emulsions, that is, the naturally occurring oil-in-water emulsions, having a significant proportion of dispersed phase and a substantially complete absence of a protective colloid or equivalent substance, appear to be substantially a new type of emulsion that requires a new method of treatment, in order to separate them economically and rapidly into their component parts, and thus permit the recovery of dry or merchantable oil.

It is to be emphasized that the external phase or continuous phase of these peculiar naturally occurring petroleum emulsions consists of water or a relatively dilute brine that apparently does not froth, that apparently has a normal surface tension, and which on evaporation, does not appear to yield a substance having the characteristic properties of hydrophile protective colloids or common emulsifying agents for the oil-in-water type of emulsion.

We have discovered that these unique emulsions having the peculiar characteristics above referred to, can be rapidly separated into their component parts by treating the same with a minimal concentration of a hydrophile colloid of the kind hereinafter described. The effective hydrophile colloids intended to be used as the treating agent in our process, are those which give rise only to very small electrical effects when adsorbed at interfaces. In general, they are either the weakly ionized, amphoteric or unionized hydrophile colloids, and are further characterized by the fact that they contain a multiplicity of polar groups, such as —COOH, —COOR, R—O—R, —OH, —NH$_2$, —NRH, NR$_2$, —CO—NH—, etc., where R is a univalent organic radical. It may happen that all the polar groups which are present in a hydrophile colloid are of the same kind, or they may be of substantially different kinds, or they may be of several varieties which are generically related to each other. Such hydrophile colloids are characterized by the fact that the polar groups are not segregated at a particular point but are distributed more or less uniformly throughout the molecule, so that their solution or sol contains a body having what appears to be a more or less uniformly hydrated surface, although the chemical structure of the molecule indicates that the hydrated zones must be interrupted or alternated by non-hydrated zones or groups of non-polar or hydrophobe character.

This feature of distributed hydration along with the concomitant property of distributed hydrophobe characteristics, distinguishes these materials from other hydrophile colloids such as soaps, the molecules of which are considered as being made up of one definitely polar hydrated end, and one definitely non-polar, non-hydrated end. Inasmuch as these hydrophile colloids contain more than one polar group, they may be referred to as "multipolar" and may be defined as the multipolar, substantially un-ionized type of hydrophile colloid. The expression "substantially un-ionized" as herein used, is intended to include the previously described hydrophile colloids which give rise to minimal electrical effects.

The colloidal dispersions of these hydrophile colloids are relatively non-sensitive to electrolytes, and they often form gels or very viscous, aqueous dispersions. Materials such as soaps, highly ionized dyes, and other relatively strong colloidal electrolytes, high molecular weight organic sulfates and sulfonates, are not included in this classification. Examples of materials having the properties which make them suitable for use as a demulsifying agent for breaking the peculiar oil-in-water type emulsion previously described are: glue, gelatin, casein, starch, albumin, tannin, dextrin, methyl cellulose, water soluble ethyl cellulose, prosopis juliflora exudate, gum arabic, many other water dispersible gums, water dispersible urea-aldehyde resins, etc. In some instances, a mixture of two or more of such materials or colloids may be more effective than one alone. It is recognized that some of these products, such as starch, glue, or the like, produce degradation products which are similar in colloidal nature to their parent material. Obviously such degradation products could be used with equal effectiveness. In order to designate only the desired type of hydrophile colloid and to exclude the unsuitable type, we will refer to the type employed as being substantially un-ionized. The expression "substantially un-ionized" is meant to include the type which is un-ionized or weakly ionized or amphoteric.

We have found that when the peculiar oil-in-water type emulsion previously described is treated by adding to the same a very small amount of one of the materials or colloids above mentioned or a mixture of two or more of the same, that the component parts of the emulsion will effectively separate. Often one part of the proper colloid added to 100,000 or more parts of emulsion will bring about a separation. In some cases, as much as one part of colloid to 10,000 or even 5,000 parts of emulsion may be required for satisfactory separation. If much more of the colloid is added than is just sufficient to give a satisfactory separation, the emulsion may not be broken at all, but may, on the other hand, be made more stable. For this reason it is important to determine by preliminary tests preparatory to treating a batch of emulsion, just how much of the colloid is necessary to break that particular emulsion or effect the separation of the component parts of the emulsion. Such tests are conveniently made as follows:

Into each of six 150 ml. sample bottles, pour 100 ml. of the emulsion to be tested. Into the first sample bottle, add the proper amount of a dilute solution in water or other inert solvent, of the colloid to be tested to give a concentration of one part of colloid to about 200,000 parts of emulsion. To each of the other bottles add increasingly larger amounts of the colloid solution, so that the ratio of colloid to emulsion will range from 1/200,000 to 1/5,000 from the first sample bottle to the sixth sample bottle. After the colloid solution has been added to each bottle, stopper and shake vigorously for two or three minutes, and then allow to stand. The emulsion in one or two of the bottles will then, in general, show a more rapid and complete separation than that in the other bottles. Six fresh samples of emulsion are then poured and varying amounts of colloid solution are added to these samples to cover the range between and around the concentrations used in the sample showing the best separation in the first test. This second series is treated in the same manner as the first series, and some of these samples will, in general, show a better separation than others. The elimination is continued in this manner until a series is obtained in which all samples appear to separate equally well. When the colloid is used commercially on the particular emulsion for which the test mas made, said colloid is added to the emulsion in an amount to give a ratio of colloid to emulsion which lies within the range covered by this last test. In actual practice, the exact ratio is also determined in part by the working tolerance of a metering pump or similar device, but it is understood that any reasonable variation is not objectionable except for wastage of the reagent involved as long as one stays reasonably within the zone of maximum precipitation.

The colloids or materials intended to be used in practicing our process may be prepared commercially by dissolving a hydrophile colloid of the kind described, say glue or commercial gelatin, in water to the extent of from 1-10%, and adding to the solution a small but sufficient amount of methyl salicylate, zinc chloride, or other preservative. Any compatible coloring matter or odorant may be added if desired.

In using said material to break or treat the peculiar oil-in-water type emulsion previously described, the material is added to the emulsion in the same manner and by the procedure commonly employed in processes in which demulsifying agents are used for treatment of conventional oil field emulsions, care being taken to add said material in the proximate amount as determined by the preliminary test described above. In some cases, alcohol, ether, or other inert organic liquids may be added to the material intended to be used as the treating agent of our process, so as to lower the viscosity and improve the physical properties of said material. In certain other cases, the addition of an electrolyte to a hydrophilic colloid produces a very satisfactory treating medium as the addition of the electrolyte lowers the viscosity and improves the action of the hydrophilic colloid. The use of this combination of a hydrophilic colloid of the kind described and an electrolyte, for breaking emulsions, is disclosed in the copending application of Charles M. Blair, Jr., Ser. No. 179,421, filed Dec. 13, 1937.

Having thus described our invention, what we claim as new and desire to secure by Letters Patent is:

1. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising a multipolar, substantially un-ionized colloid of distributed hpdrophilic character, the said demulsifier being used in a ratio of less than one part of demulsifier to 1,000 parts of emulsion.

2. A process of the kind described in claim 1, in which the minimum amount of the demulsifier required to effect the separation of the component parts of the emulsion, is added to the emulsion.

3. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising a multipolar, substantially un-ionized protein type colloid of distributed hydrophilic character, the said demulsifier being used in a ratio of less than one part of demulsifier to 1,000 parts of emulsion.

4. A process of the kind described in claim 3, in which the minimum amount of the demulsifier required to effect the separation of the component parts of the emulsion, is added to the emulsion.

5. A process for breaking naturally occurring oil-in-water type crude petroleum emulsions that are substantially free from usual emulsifying agents and in which the dispersed phase represents a significant proportion of the total emulsion, a characterized by subjecting the emulsion to the action of a demulsifier consisting of glue, the said demulsifier being used in a ratio of less than one part of demulsifier to 1,000 parts of emulsion.

6. A process of the kind described in claim 5, in which the minimum amount of glue required to effect the separation of the component parts of the emulsion, is added to the emulsion.

7. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier consisting of starch, the said demulsifier being used in a ratio of less than one part of demulsifier to 1,000 parts of emulsion.

8. A process of the kind described in claim 7, in which the minimum amount of starch required to effect the separation of the component parts of the emulsion, is added to the emulsion.

9. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier consisting of prosopis juliflora exudate, the said demulsifier being used in a ratio of less than one part of demulsifier to 1,000 parts of emulsion.

10. A process of the kind described in claim 9, in which the minimum amount of prosopis juliflora exudate required to effect the separation of the component parts of the emulsion, is added to the emulsion.

11. A process for breaking naturally occurring oil-in-water type crude petroleum emulsions that are substantially free from usual emulsifying agents and in which the dispersed phase represents a signficant proportion of the total emulsion, characterized by subjecting the emulsion to the action of a demulsifier consisting of glue, to which has been added an appreciable amount of a suitable preservative, the said demulsifier being used in a ratio of less than one part of demulsifier to 1,000 parts of emulsion.

12. A process of the kind described in claim 11, in which the minimum amount of the demulsifier required to effect the separation of the component parts of the emulsion, is added to the emulsion.

CHARLES M. BLAIR, JR.
CHARLES CLINTON ROGERS, JR.